United States Patent [19]

Phillips, Jr.

[11] Patent Number: 4,457,089

[45] Date of Patent: Jul. 3, 1984

[54] DECORATIVE, ILLUMINATED AUTOMOTIVE REFLECTOR

[76] Inventor: Wilbert H. Phillips, Jr., 19771 Quiet Bay Ln., Huntington Beach, Calif. 92648

[21] Appl. No.: 308,044

[22] Filed: Oct. 2, 1981

[51] Int. Cl.³ ............................................. G09F 13/22
[52] U.S. Cl. ...................................... 40/544; 40/219; 40/615; 40/204
[58] Field of Search ................. 40/615, 544, 204, 200, 40/562, 564, 582

[56] References Cited

U.S. PATENT DOCUMENTS

| | | | |
|---|---|---|---|
| 2,958,762 | 11/1960 | Cheney | 40/544 |
| 3,188,761 | 6/1965 | Harrold | 40/544 |
| 3,284,941 | 11/1966 | Kaup | 40/544 |
| 3,404,474 | 10/1968 | Johnson | 40/544 |
| 3,510,976 | 5/1970 | Pauline et al. | 40/564 |
| 3,680,237 | 8/1972 | Finnerty | 40/544 |
| 3,978,599 | 9/1976 | Berger | 40/564 |
| 4,005,538 | 2/1977 | Tung | 40/582 |
| 4,195,431 | 4/1980 | Neufeld | 40/544 |

Primary Examiner—Gene Mancene
Assistant Examiner—Wenceslao J. Contreras
Attorney, Agent, or Firm—Romney Golant Martin Disner & Ashen

[57] ABSTRACT

An automotive decorative display panel is devised to provide a reflective black insignia on a bright field during daylight conditions and illuminated insignia on a dark field during night-time conditions. The illuminated display panel is comprised of a lens panel having a reflective, opaque field and a translucent insignia field. A screen is disposed behind the insignia field. The screen is characterized by being partially reflective and partially transmissive. During the day, light is reflected from the screen through the insignia portion to form a black insignia field against the bright reflective field. During the night the screen is back lit to form a bright insignia field against a relatively dark background. A solid state electroluminescent panel is used as the light source in a hermetically sealed package. In addition, the screen is composed of a plurality of line print screens of decreasing line density wherein each screen is rotated with respect to the adjacent screen in order to remove moiré patterns.

6 Claims, 7 Drawing Figures

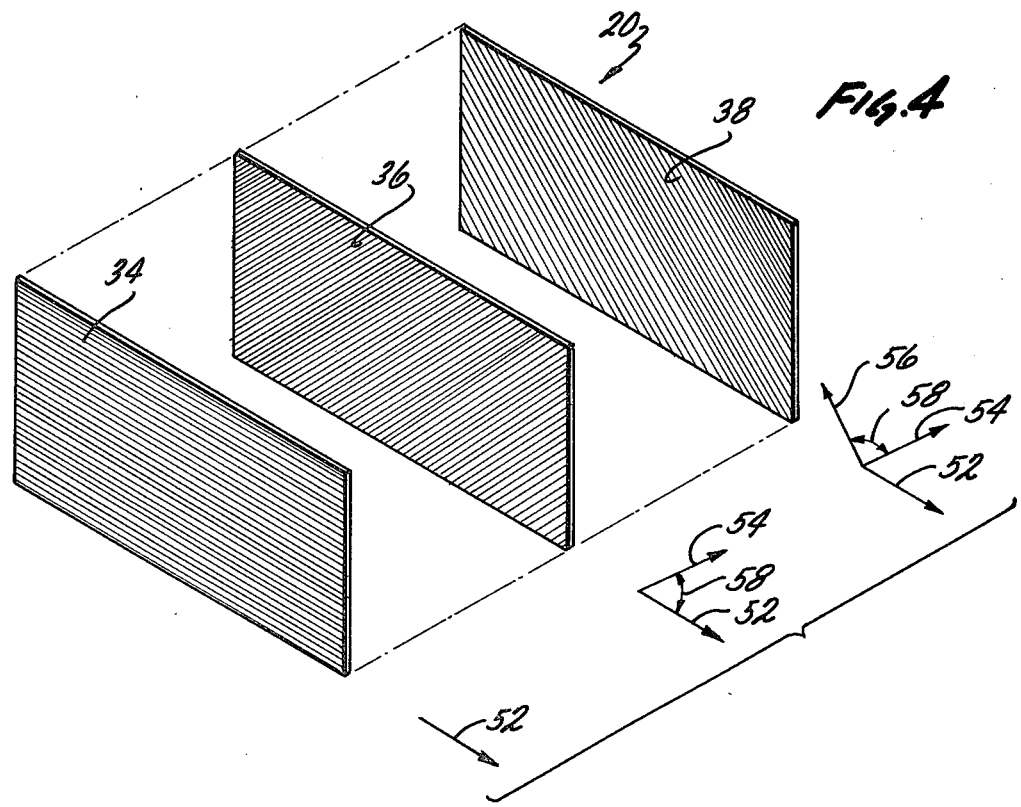
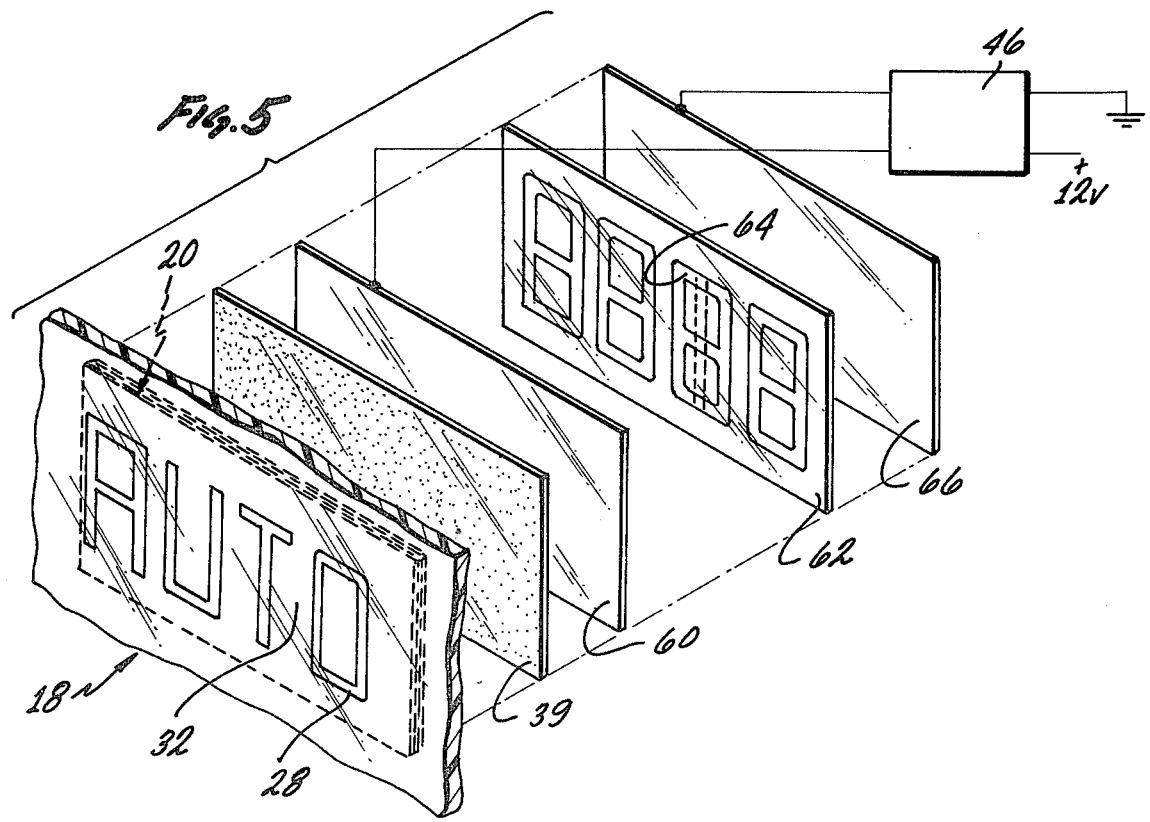

DECORATIVE, ILLUMINATED AUTOMOTIVE REFLECTOR

BACKGROUND OF THE INVENTION

1. Field of the Invention

The present invention relates to the field of decorative panels for automobiles and in particular relates to reflective lens assemblies adapted for rear mounting on an automobile.

2. Description of Prior Art

Decorative, reflective assemblies are well-known to the art and are typically used to display the name or trademark of the automobile. Typically, such reflectors have been made of red plastic with a portion opaquely or darkly colored to form a graphic display, usually constituting the name of the automobile to which it is attached. The plastic lens panel of the prior art is designed to have a reflective field against which a nonreflective or opaque graphic section is contrasted. In sunlight the graphic appears as dark lettering observed against a bright background. However, none of the prior art lens assemblies were illuminated or backlit and visibility afforded by such decorative assemblies at night is generally poor and unacceptable.

What is needed then, is a decorative automotive panel which can serve the desired decorative uses equally well at night as by day, and which is adapted for retrofitting as well as original equipment manufacturer's installation. While the advantages and structure of electroluminescent panels is generally known, there has been virtually no commercially successful adaptation and modification of such panels for use as a visual external accessory for automobiles and the like.

BRIEF SUMMARY OF INVENTION

The present invention is an apparatus comprising a lens panel having the reflective portion and a translucent insignia portion. A light source is disposed behind the lens panel. A screen is disposed at least behind the insignia portion of the lens panel and in front of the light source. The screen is at least partially reflective to light incident thereon through the insignia portion and at least partially transparent to light transmitted there through from behind the screen from the light source. A back plate may also be provided which is coupled to the lens panel and is ultrasonically or hermetically sealed thereto. The back plate is of such configuration that it is adapted to receive or nest the light source and/or screen and then to press the screen and light source tightly against the insignia portion of the lens panel when the back plate is coupled to the lens panel.

The lens, screens, light source and back plate form a rugged, very thin and hermetically sealed unit which is particularly adapted to be retrofitted to license frame wells of existing automobile models.

The various embodiments of the present invention and its organization and method of use can more clearly be understood by viewing the following figures wherein like elements are referenced by like numerals.

BRIEF DESCRIPTION OF THE DRAWINGS

FIG. 4 is a simplified diagram illustrating the orientation of three screened prints with respect to each other according to the teachings of the present invention.

FIG. 5 is a front view of the electroluminescent panel of the present invention shown as a simplified, exploded view.

DETAILED DESCRIPTION OF THE PREFERRED EMBODIMENT

The present invention is a combined safety/decorative panel for automotive usage, which panel serves as a reflector under daylight conditions, during which time it displays an insignia, usually denoting the make of the automobile, as dark letters against a light or bright field. During the night the assembled panel of the present invention presents a bright insignia against a comparatively dark field. The assembly is made in such a manner that it has minimal thickness, is rugged and easily mounts or is retrofitted to the back panel of an automobile. The assembly is also hermetically sealed so that it is entirely weatherproof and immune from road contamination.

Figure 1:
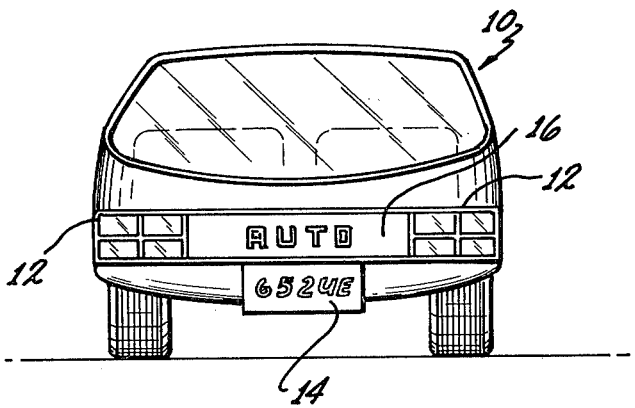
FIG. 1 is an end view of an automobile showing the decorative plate mounted between the tail lights.

The organization of the present invention and its method of operation can be better understood by viewing FIG. 1 which shows the environment of the present invention. An automobile 10 is shown in rear view. In many automobiles, the blank panel space is available between tail lights 12 and above or below the license plate position. In other cases where license plate 14 may be disposed between tail lights 12, the license plate can be removed and panel 16 of the present invention disposed between tail lights 12 with license plate 14 being conveniently relocated. Panel 16 is adapted to be both retrofitted to automobiles which are not necessarily adapted for such a panel, or to be incorporated as part of the original automobile styling. The retrofitting of panel 16 will be discussed below in greater detail in connection with FIGS. 6 and 7. Panel 16 has been shown in a rear view of automobile 10 where it has customarily been employed. However, it is entirely within the scope of the present invention that a display of this type could be adapted to other locations and uses on the exterior or interior of automobile 10 as well.

Figure 2:
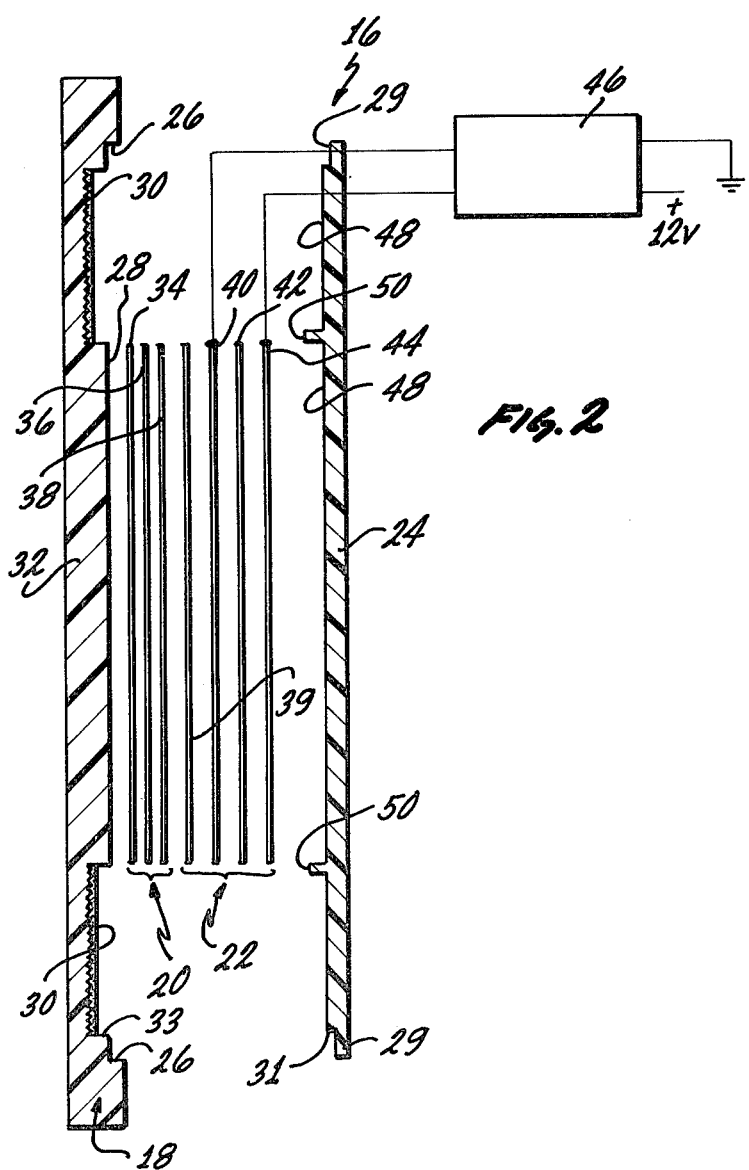
FIG. 2 is a simplified, exploded side view of one embodiment of the present invention showing the constituant elements.

FIG. 2 shows in cross-section a simplified exploded view of display panel 16. Panel 16 is comprised of a lens panel 18, a screen 20, a light source 22, and a back plate 24.

Lens panel 18 is generally made of red, translucent plastic and in the illustrated embodiment is shown as having a perimeter groove 26 arranged and configured to mate with corresponding projections 29 of back plate 24. Lens panel 18 has a raised insignia portion 28 which is shown in grossly exaggerated cross-section in FIG. 2. The remaining rear surface of lens panel 18 is provided with a reflective layer 30 to form a reflective and opaque field about insignia portion 28. The surface of panel 18 under layer 30 is provided with a roughened or faceted surface during the molding of lens panel 18 to further enhance its reflective performance.

In practice, a mask is hot-pressed onto the rear surface of lens panel 18 thereby appropriately covering raised insignia portion 28. The remaining rear surface of lens panel 18 is then sprayed or coated by conventional means with a reflective layer 30 to form the reflective field. Reflective layer 30 may be comprised of any material well-known to the art which adheres well to plastic and which provides a reflecting surface. A sprayed metallic coating can be employed as layer 30. Layer or reflective field 30 is substantially opaque. Thus, when the masking is removed from insignia portion 28, lens panel 18, when viewed from surface 32, appears as a red reflector having a translucent insignia portion 28 surrounded by a brightly reflective field 30.

Screen 20 is characterized by being partly reflective and partly transparent. In other words, light incident lens panel 18 from surface 32 is transmitted through insignia portion 28 and impinges upon screen 20. A portion of that light will be reflected back through surface 32. Thus, if screen 20 is black, a black reflected image is perceived.

In the illustrated embodiment screen 20 is comprised of a plurality of line screen prints of the type as are well-known in the photographic printing arts. Each one of screens 34, 36, and 38 are comprised of a rectangular array of black dots disposed on a transparent substrate. A wide range of line densities are available for screen prints together with a correspondingly wide range of opacity or openness of the screen. In other words, in the illustrated embodiment, the most dense screen has a line density of 150 lines per inch and a transparency of 60% which means that 60% of the area of screen 34 is not covered by the black opaque material which forms the dots. A more detailed description of screens 34, 36, and 38 will be given in connection with FIG. 4.

In the illustrated embodiment of FIG. 2, light source 22 is an electroluminescent panel. Light source 22 is thus comprised of a panel having a filter 39, a first transparent electrode 40, a light emitting active, phosphor layer 42 and a rear electrode 44. Electrodes 40 and 44 with layer 42 are actually sandwiched in a hermetically sealed package to avoid contamination and poisoning of phosphor layer 42. The construction per se of an electroluminescent panel is well understood in the art. Electrodes 40 and 44 are coupled to a power source 46, which in the case of an automobile is a conventional invertor capable of converting 12 volts d.c. to the frequency and voltage required by the electroluminescent display. More particularly, power source 46 converts the 12 volts d.c. from the automotive system to an approximately 115 volts a.c., 650 to 700 Hz driving signal at approximately 16 ma required to cause the electrode-phosphor junction to luminesce. Many other frequencies, voltage levels and waveforms, such as pulsed or continuous driving signals, may be selected according to principles well-known to the art, as well as a variety of types of active layers 42 or electroluminescent assemblies can be used without departing from the spirit and scope of the present invention. However, it has been determined that frequencies as low as 750 Hz will cause an audible hum in light source 22 and will also require use of shielded wires to avoid noise interference. A driving frequency in the range of 650 to 700 Hz avoids these problems and is still high enough to cause layer 42 to luminesce.

The color seen through insignia portion 28 is largely determined by the spectrum generated by light source 22. In the illustrated embodiment electroluminescent source 22 when unfiltered gives a yellow-orange color. The degree of red filtering produced by lens panel 18 is minimal so that insignia portion 28 will appear as a bright yellow-orange light against a dark, non-illuminated background. Color is corrected by including filter 39 between light source 22 and screen 20 to select for the appropriate color.

Electroluminescent light source 22 provides a rugged and compact light source which is well adapted to the illustrated application of the present invention.

Finally, panel assembly 16 includes a back plate 24 which is adapted and configured to receive light source 22 and screen 20. Back plate 24 has been diagramatically illustrated in grossly exaggerated form in FIG. 2 to show an area 48 in the central portion of back plate 24 surrounded by a perimeter ridge 50. Area 48 is of such a size that light source 22 and 20 conveniently nest therein. Both screen 20 and light source 22 are of such size that they are at least as large as insignia portion 28. Area 48 serves to register screens 20 and light source 22 to insignia portion 28 and to retain them in alignment thereto. Projection 29 of back plate 24 registers with indentation 26 of lens 18. Edge 31 mates with shoulder 33 so that assembly is precise, quick and certain. In one embodiment, lens 18 is 0.312 inch thick at the widest portion at the edge. Insignia portion 28 is 0.156 inch thick, which leaves up to 0.156 inch for screen 20 and light source 22. Indentation 26 and projection 29 are selected of sufficient depth or thickness such that back plate 24 tightly presses screen 20 against indicia portion 28. If the components of screen 20 are not pressed tightly together and against indicia portion 28 the degree of blackness and efficiency of performance of screen 20 can be adversely affected. Proper dimensioning of back plate 24 and lens 17 insures that sufficient pressure is brought to bear against screen 20 and indicia portion 28. The thickness of the entire assembly can be made almost equal to the thickest portion of lens panel 18 alone, which in the one embodiment is only 0.312 inch.

Figure 3:
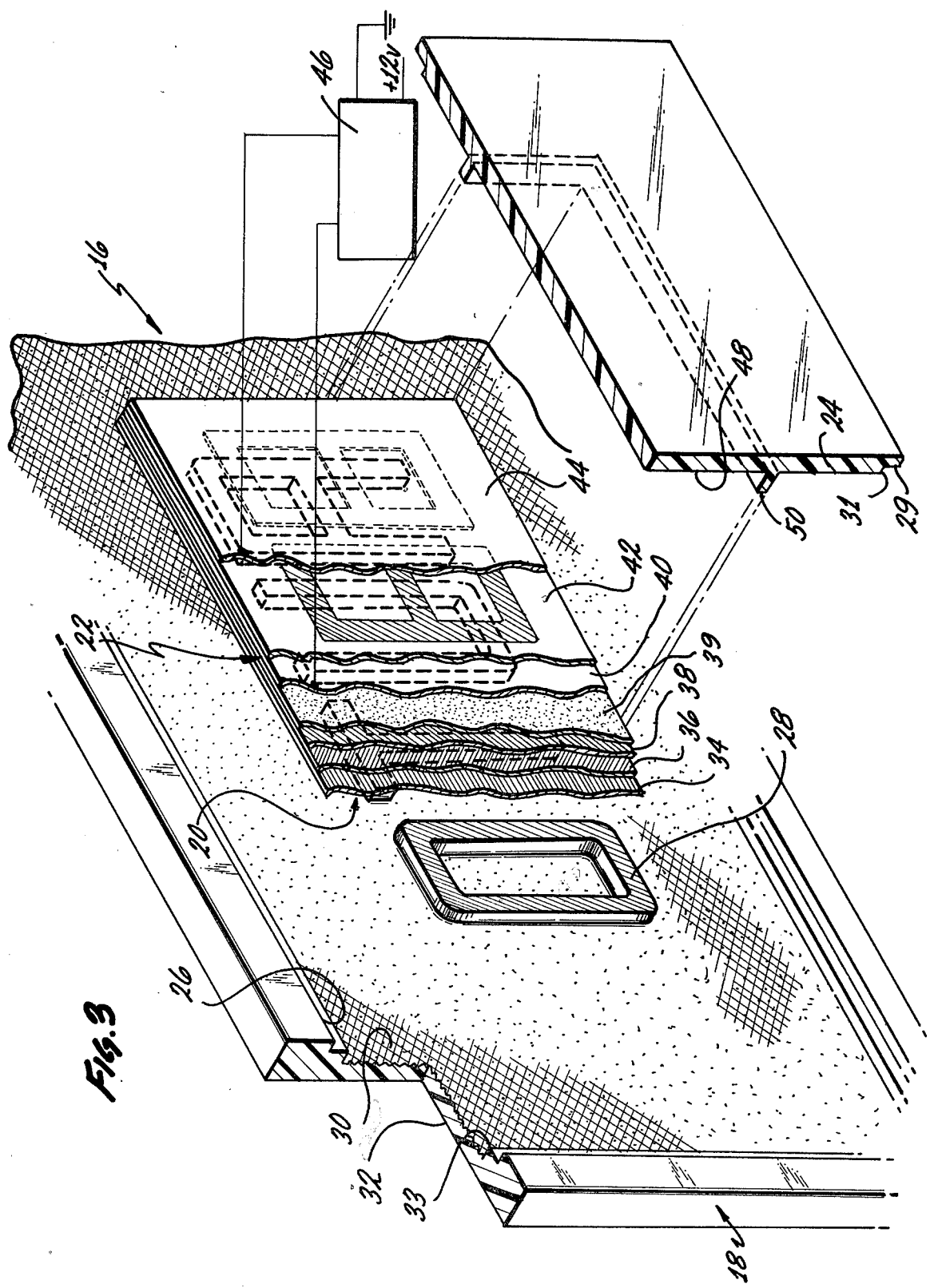
FIG. 3 is a partially cut-away rear view showing the relation between the lens, screens and light source. The back plate is omitted for clarity.

Assembled display panel 16 is shown in FIG. 3. Again, the cross-section is shown in grossly exaggerated proportions for the sake of clarity and illustration. The thickness of screen 20 and light source 22 are very small when compared against the thickness of lens panel 18 and back plate 24. Perimeter projections 29 of back plate 24 mate into perimeter indentations 26 defined in panel 18. Back plate 24 is then ultrasonically welded to panel 18 by conventional means to form a hermetic seal. Electrical leads pass from light source 22 through back plate 24 or through another appropriate location within panel assembly 16 to inverter 46 which is located nearby. Typically, inverter 46 is located in the trunk of auto 10 in reasonable proximity to display assembly 16. Through-holes in assembly 16 provided for the leads from light source 22 are appropriately sealed by an adhesive or conventional filler.

As a result of this assembly, back plate 24 is hermetically sealed or bonded to panel 18 to provide a very thin, perfectly sealed, hermetic enclosure for screen 20 and light source 22. Thus, display panel 16 forms a completely weatherproof unit which is impervious to water, and all other road contaminants which might otherwise interfere with or degrade performance of display panel 16.

The relation of screens 34, 36 and 38 is, diagramatically illustrated in FIG. 4. Screen 34 is the most dense line print screen of the plurality of screens forming composite screen 20. In the illustrated embodiment, screen 34 has a line density of at least 150 lines per inch.

Screen 36, which is immediately adjacent to screen 34 has a smaller line density than screen 34 and has the orientation of its grid, i.e. the lines of the columns and rows of dots, angularly orientated with respect to screen 34 at just that angle required to make moire patterns which are produced by the combination of screens 34 and 36, to disappear. If screens 34 and 36 were not rotated with respect to each other, a wave-like or watery moire pattern apears by virtue of small displacements between the arrays in each screen. When the moire pattern is avoided, a completely opaque and uniform insignia pattern will appear as solid block letters in daylight illumination.

A third screen 38 may be added to still further improve the opacity of the reflected pattern from composite screen 20. Screen 20 is then comprised of screens 34, 36, and 38 sandwiched together. For the reasons just described, the orientation of the line pattern of screen print 38 is similarly rotated with respect to screen 36 in order to make the moire pattern between screens 36 and 38 and 34 and 38 disappear. Each of the screens of composite screen 20, as illustrated in FIG. 4, have an overall transparency of 60%. In other words, each of the screens 34, 36, and 38 and FIG. 4 have at least 60% of its area completely transparent and not covered by the black dots disposed on each screen. The angular orientation of each screen with respect to its adjacent screen is dependent upon the comparative transparency of each screen and their comparative line density. The angle required to avoid moire patterns in the composite screen can be found experientially in each case.

In the present embodiment, the desired opacity to reflected light and the desired transparency to transmitted light has been found to be most easily achieved by employing screens 34, 36, and 38 wherein each screen has a decreasing line density, with screen 34 being the most dense and screen 38 being the least dense. Again, the desired decrease in line density can be experientially found in each case, but in the illustrated embodiment, screen 34 has a line density of 150 lines per inch, screen 38 is chosen to have a line density of approximately 80–100 lines per inch with screen 36 selected in the range therebetween, namely having a line density of between 150 lines per inch and 100 lines per inch. The line orientation of screen 34 is illustrated in FIG. 4 as being in direction 52; as being in direction 54 for screen 36 and as being in direction 56 for screen 38. Angle 58 between directions 52 and 54 and directions 54 and 56 in the illustrative embodiment is chosen to be equal, and is approximately 30 degrees. Thus, as illustrated, screen 34 would be characterized as a 0° screen, screen 36 as a 30° screen and screen 38 as a 60° screen. In practice, the dot array orientations which are available are 45°, 75° and 105° with respect to the edge of each screen. The minimization of moire patterns is reasonably gradual such that relative angular displacements close to these ratios will also tend to minimize the moire effect. Such close ratios are thusly also included within the scope of this invention. Again, the angles between each screen, the line densities and their progression can easily be varied and selected according to the teachings of the present invention to have other values than those illustrated here. For example, it is entirely within the scope of the present invention that screens 34–38 may be combined in any sequence, e.g. (45°, 75°, 105°) or (75°, 45°, 105°) or any other permutations or combinations.

FIG. 5 illustrates the embodiment of the electroluminescent light source of the present invention. Shown in simplified, exploded view in FIG. 5 is a front transparent electrode 60, an inner substrate 62 upon which a light emitting active layer 64 has been selectively disposed, and a rear electrode 66. As before, electrodes 60 and 66 are appropriately coupled to a power source 46. The pattern of light emitting active layer 64 or the phosphor disposed on substrate 62 of the electroluminescent panel of FIG. 5 is chosen to be in the form of a plurality of block "eights" registered with insignia portion 28 of lens panel 18. In other words, active layer 48 is formed in a generalized shape of all the insignia appearing in lens panel 18 and therefore has a configuration which is similar to and an area which is only slightly larger than insignia portion 28. It is contemplated that selectively disposed layer 64 will be somewhat larger than its corresponding insignia portion 28 in order to eliminate any criticality of registration. The embodiment of FIG. 4 will decrease fabrication costs by minimizing the amount of phosphor used and will minimize the power requirements of circuit 46 without any sacrifice of useful light intensity. Also, the separately sectioned luminescent portions enable a faulty section to be replaced during manufacture without replacing the entire panel. It is to be understood that the shape of layer 24 is determined in part by the specific word spelled out by the insignia. For example, the bar eight shape shown in FIGS. 3 and 5 are appropriate for automobile names such as "Porsche" or "BMW", but may be inappropriate for the word "AUTO". In that regard, the "T" in "AUTO" cannot be accommodated in conventional block lettering. In that case, a vertical bar can be made through the center of the bar eight shape as illustrated in FIG. 5.

Figure 6:
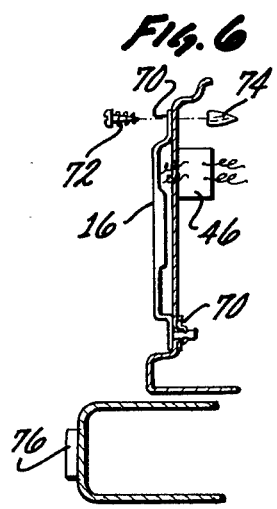
FIG. 6 is a side view showing the assembled panel mounted to the license plate well of a BMW.

FIG. 6 shows assembly 16 retrofitted to the license well of a BMW automobile above bumper 76. Assembly 16 is provided with a flange extension 70 or mounting holes in the solid edge of lens 18 which just aligns with the license plate mounting holes of a BMW. The bottom of assembly 16 has a stud extension which fits through an existing license plate hole and is secured with a speed nut. Thus, without any modification, lens 18 can be attached to auto 10 by screw or bolt 72 and threaded into nylon insert 74 through the manufacturer's license plate through-holes. Inverter 46 is conveniently mounted nearby in the trunk space of auto 10 with a small through-hole drilled through the back panel of auto 10.

Figure 7:
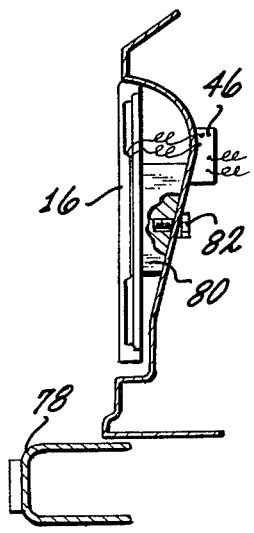
FIG. 7 is a side view showing the assembled panel mounted to the license plate well of a Porsche.

FIG. 7 illustrates another retrofitted assembly 16 attached above bumper 78 to the license well of a Porsche. Because the license well is a concave volume, assembly 16 is provided with a projection or offset 80. In practice, offset 80 may be molded as part of back plate 24 or may be adhered thereto as a separate spacer. Assembly 16 can then be bolted to offset 80 as shown in FIG. 7 by bolt 82. Offset 80 serves to space assembly 16 at the proper distance and inclination from the surface of the license well. Again, inverter 46 is mounted inside the trunk at a convenient, nearby location and coupled to assembly 16 through a pair of small, unshielded wires.

As is readily apparent from FIGS. 6 and 7, the present invention results in a rugged, very thin, weatherproof and dustproof illuminated panel which is easily retrofitted to existing license plate wells with a minimum degree of modification to achieve a secure attachment.

It must be understood that many modifications and alterations may be made by one having ordinary skill in the art without parting from the spirit and scope of the present invention. For example, although the insignia portion has been indicated as being the name of the automobile and has been shown as a rear decorative mount, it is entirely possible that the present invention could be employed as an instrument indicator within the automobile. Furthermore, although screen 20 has been described in the illustrated embodiment as a composite screen comprised of sandwiched line screen prints, it is also possible that many other types of screens could be substituted. For example, a half silvered mirror could be used as well to provide reflective daylight characteristics and nighttime transmissive characteristics for screen 20.

The illustrated embodiment has been presented only for the purpose of clarification and example and it is not intended in any manner to limit the breadth of the invention as set forth in the following claims.

I claim:

1. An apparatus comprising:
   a lens panel having a reflecting portion and a translucent insignia portion;
   a screen disposed at least behind said insignia portion, said screen being at least partially reflective to light incident thereon through said insignia portion, and at least partially transparent to light therethrough from behind said screen, and wherein said screen is a plurality of line screen prints, each one of said plurality of prints being angularly oriented to each other one of said plurality of line screen prints to avoid moire patterns and
   a light source disposed behind said screen, whereby a day reflector is devised which reflectively displays said insignia portion under daylight, and which illuminates said insignia portion during night.

2. The apparatus of claim 1 wherein the line density of each screen print is unequal.

3. The apparatus of claim 2 wherein said plurality of line screen prints are positioned in order of decreasing line density.

4. The apparatus of claims 1, 2, or 3 wherein each said screen print is approximately 60% open.

5. The apparatus of claim 1, 2, or 3 wherein the most dense of said screen prints has a density of at least 150 lines per inch.

6. The apparatus of claim 5 wherein each screen is rotated approximately 30° with respect to an adjacent screen.

* * * * *